Jan. 4, 1966  D. D. HAMILTON ETAL  3,227,295
SELF-LOADING FULL TREE SKIDDING VEHICLE
Filed Dec. 9, 1964  18 Sheets-Sheet 1

INVENTORS
DOUGLAS D. HAMILTON
RAOUL RANZENHOFER.
BY Martin J. Marcus
AGENT

Jan. 4, 1966    D. D. HAMILTON ETAL    3,227,295
SELF-LOADING FULL TREE SKIDDING VEHICLE
Filed Dec. 9, 1964    18 Sheets-Sheet 2

INVENTORS
DOUGLAS D. HAMILTON
RAOUL RANZENHOFER
BY Martin J Marcus
AGENT

Jan. 4, 1966     D. D. HAMILTON ETAL     3,227,295
SELF-LOADING FULL TREE SKIDDING VEHICLE
Filed Dec. 9, 1964                        18 Sheets-Sheet 4

INVENTORS
DOUGLAS D. HAMILTON
RAOUL RANZENHOFER
BY Martin J Marcus
AGENT

Jan. 4, 1966  D. D. HAMILTON ETAL  3,227,295
SELF-LOADING FULL TREE SKIDDING VEHICLE
Filed Dec. 9, 1964  18 Sheets-Sheet 6

INVENTORS
DOUGLAS D. HAMILTON
RAOUL RANZENHOFER
BY Martin J Marcus

AGENT

Jan. 4, 1966   D. D. HAMILTON ETAL   3,227,295
SELF-LOADING FULL TREE SKIDDING VEHICLE
Filed Dec. 9, 1964                               18 Sheets-Sheet 8
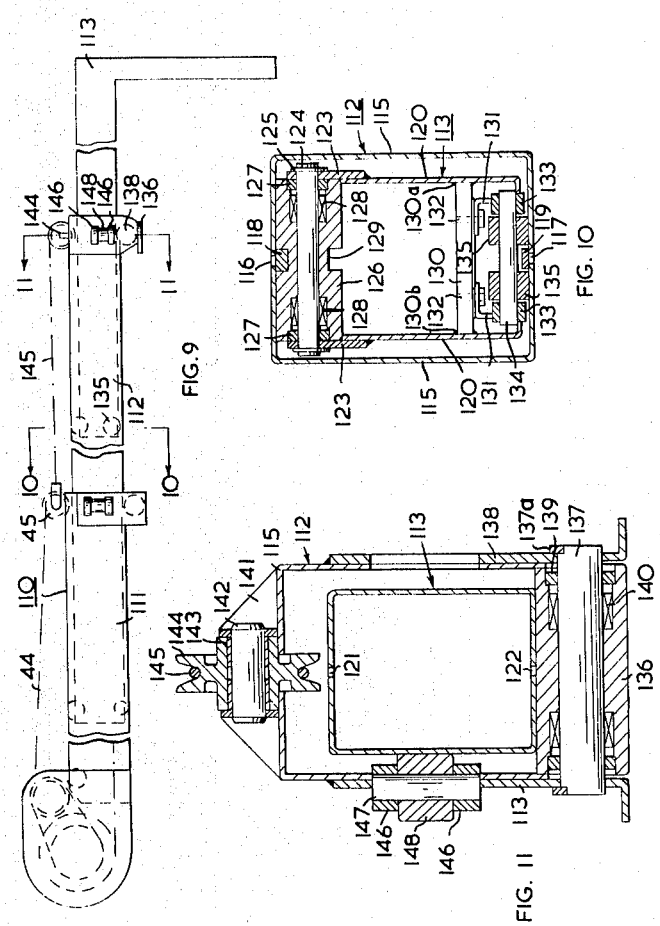
INVENTORS
DOUGLAS D. HAMILTON
RAOUL RANZENHOFER
BY Martin J Navens
AGENT Jan. 4, 1966   D. D. HAMILTON ETAL   3,227,295
SELF-LOADING FULL TREE SKIDDING VEHICLE
Filed Dec. 9, 1964   18 Sheets-Sheet 9

INVENTORS
DOUGLAS D. HAMILTON
RAOUL RANZENHOFER
BY Martin J Marcus
AGENT

Jan. 4, 1966          D. D. HAMILTON ETAL          3,227,295
              SELF-LOADING FULL TREE SKIDDING VEHICLE
Filed Dec. 9, 1964                              18 Sheets-Sheet 10

INVENTORS
DOUGLAS D. HAMILTON
RAOUL RANZENHOFER
BY *Martin J Marcus*

AGENT

Jan. 4, 1966  D. D. HAMILTON ETAL  3,227,295
SELF-LOADING FULL TREE SKIDDING VEHICLE

Filed Dec. 9, 1964  18 Sheets-Sheet 11

INVENTORS
DOUGLAS D. HAMILTON
RAOUL RANZENHOFER
BY Martin J Marcus
AGENT

Jan. 4, 1966 D. D. HAMILTON ETAL 3,227,295
SELF-LOADING FULL TREE SKIDDING VEHICLE
Filed Dec. 9, 1964 18 Sheets-Sheet 12

INVENTORS
DOUGLAS D. HAMILTON
RAOUL RANZENHOFER
BY
Martin J. Marcus
AGENT

Jan. 4, 1966　　　D. D. HAMILTON ETAL　　　3,227,295
SELF-LOADING FULL TREE SKIDDING VEHICLE
Filed Dec. 9, 1964　　　　　　　　　　　　　　　18 Sheets-Sheet 13

INVENTORS
DOUGLAS O. HAMILTON
RAOUL RANZENHOFER
BY Martin J Marcus

AGENT

Jan. 4, 1966 D. D. HAMILTON ETAL 3,227,295
SELF-LOADING FULL TREE SKIDDING VEHICLE
Filed Dec. 9, 1964 18 Sheets-Sheet 14

INVENTORS
DOUGLAS D. HAMILTON
RAOUL RANZENHOFER
BY Martin J Marcus

AGENT

Jan. 4, 1966   D. D. HAMILTON ETAL   3,227,295
SELF-LOADING FULL TREE SKIDDING VEHICLE
Filed Dec. 9, 1964   18 Sheets-Sheet 17

INVENTORS
DOUGLAS D. HAMILTON
RAOUL RANZENHOFER

By *Martin J Marcus*

AGENT

United States Patent Office 3,227,295
Patented Jan. 4, 1966

3,227,295
SELF-LOADING FULL TREE SKIDDING VEHICLE
Douglas D. Hamilton, 139 Lazara, Mount Royal, Quebec, Canada, and Raoul Ranzenhofer, 118 Highgate, Pointe Claire, Quebec, Canada
Filed Dec. 9, 1964, Ser. No. 417,083
11 Claims. (Cl. 214—77)

This application is a continuation-in-part of application Serial No. 214,754 filed Aug. 3, 1962.

This invention is directed to a self-loading, full tree skidder vehicle.

In the past, when it was desired to move felled trees from the area in which they were felled, to a processing area, it was necessary to place a choker around each individual log, to string a wire rope through each of the individual chokers and attach the wire rope to the winch of a tractor. The tractor then winched the trees to itself until the butts were clear of the ground, after which it was able to drag the trees to a processing area.

When it was desired to disengage the tractor from the trees, it was necessary to release the rope on the winch and to disconnect the chokers individually. It is clear that the manipulation of the wire rope is a laborious and costly operation.

Accordingly, the object of one aspect of the present invention is the provision of a self-propelled, self-loading vehicle which may be used to load the butts of full trees onto a bunk so that the trees may be dragged out from the felling area to the working area, the cables and chokers being replaced by a telescoping boom provided with a grapple and a tree heeling device, thus effecting a labour and cost reduction.

The object of another aspect of this invention is the provision of such a vehicle in which the telescoping boom is provided with a tree grapple having a resilient grip.

In accordance with a broad feature of the present invention there is provided a self-propelled, self-loading, skidder, comprising: a tractor, loading means on said tractor for engaging a selected prefelled tree from a first position on the ground, and for manoeuvering said tree onto a loading station on said vehicle, said means comprising a boom comprising support means, a fixed member pivotally mounted on said support means for tilting movement in a vertical direction; a plurality of members telescoped within said fixed member; a plurality of guide rollers on said fixed member and on each of said movable members said rollers cooperating with said fixed member and with said movable members to support and guide said plurality of members for movement with respect to said first member and with respect to each other; and means interconnecting said first member and said plurality of movable members for extending said plurality of members outwardly with respect to said first member and with respect to one another to lengthen said boom, and for moving said movable members inwardly with respect to said first member and with respect to one another to shorten said boom, a heeling device rigidly secured to and depending from, said fixed member, and a grapple means secured to the outer end of the innermost movable member; means separate and distinct from said loading means said operable to engage selected trees at said loading station and for retaining said trees at said loading station; means to operate said engaging means selectively to engage and to disengage said trees; and means for operating said tractor.

By a specific aspect of this invention the means to operate the telescoping boom comprises: cable means, and sheaves associated therewith, whereby winding of said cables on said sheaves moves said movable portions outwardly with respect to said fixed portion and said movable portions; and cable means and sheaves associated therewith, whereby winding of said cables on said sheaves moves said movable portions inwardly with respect to said fixed portion and said movable portions. Preferably, the sheave system is particularly adapted for winding a first cable and a hydraulic hose simultaneously while unwinding a second cable, said system comprising: a framework provided with a pair of spaced apart shafts; a sheave and coupled driving sprocket journalled onto one of said shafts; a pair of coupled sheaves having a driving sprocket coupled thereto journalled onto the other of said shafts; driving means between said sprockets; a rotary joint at one end of said other shaft; and means, on said other shaft, connecting said rotary joint to said coupling.

By a specific aspect of this invention, the heeling device comprises a horizontal, transverse plate, and a pair of diverging, downwardly extending legs originating at opposite ends of said transverse plate.

By another specific aspect of this invention the grapple comprises a substantially sickle-shaped fixed tong; a substantially crescent-shaped tong, pivotally secured at one end thereof to a mid portion of said fixed tong; an hydraulic cylinder interconnecting the fixed tong and the movable tong; and means for actuating said hydraulic cylinder whereby to cause said movable tong to move. In this aspect, the grapple also includes means for actuating said hydraulic cylinder wherein actuation of said hydraulic cylinder causes said movable tong to be pivoted away from said fixed tong, and wherein said movable tong is biased to move towards said fixed tong by means of an hydraulic accumulator.

Preferably the grapple is of the type wherein a movable tong is pivoted towards and away from a fixed tong, the operating means for said grapple comprising; an hydraulic pump directly connected to an hydraulic cylinder and actuatable for causing said movable tong to pivot away from said fixed tong; and an hydraulic accumulator connected to said hydraulic cylinder and actuatable for causing said movable tong to pivot towards said fixed tong. In other words, in the grapple, an hydraulic cylinder is employed to actuate the movable tong toward and away from the fixed tong. The "resilient grip" on said grapple, is achieved by connecting the aforementioned cylinder for its closure stroke, to an hydraulic accumulator containing a combination of gas and oil under pressure. The opening stroke is a direct connection to an hydraulic pump having sufficient pressure capability to open the tong and at the same time re-compress the gas in the accumulator, thus storing sufficient oil for the next closure stroke.

By still another aspect of this invention, the loading station is a tree bunk assembly comprising: a deck; a transverse tree bunk bar mounted on said deck for movement at least a major component of which is along a vertical axis; means interconnecting said tree bunk bar and said deck; means for moving said tree bunk bar along said vertical axis component; and means for actuating said moving means, said deck comprising a swivel deck rotatably mounted on a frame and means governing the rotation thereof. Preferably the bunk comprises a deck, a pair of transversely spaced-apart posts upstanding from said deck; a vertically slidable plate disposed between said posts; tree engaging teeth along the upper edge of said plate; means associated with said posts and with lateral edges of said plate, and operative to slide said plate upwardly and downwardly; and a spring loaded chain means cooperating with said plate.

In the accompanying drawings:

FIGURE 9 is a side elevation of one embodiment of a boom for use with the present invention;

FIGURE 10 is a section along the line 10—10 of FIGURE 9 showing only the two telescoped boom structures;

FIGURE 11 is a section along the line 11—11 of FIGURE 10;

GENERAL DESCRIPTION OF FIGURES 1–4

Figure 1:
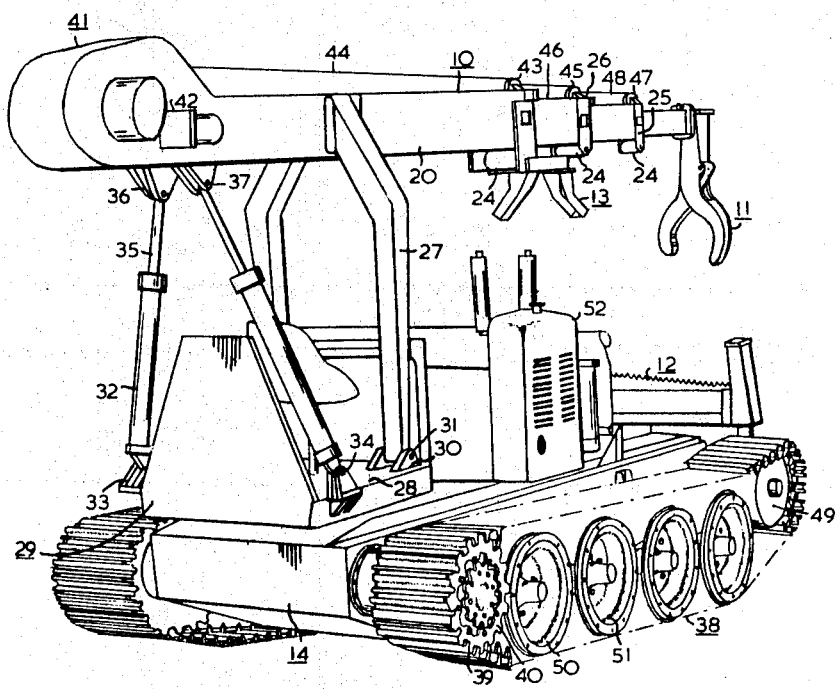
FIGURE 1 is a perspective view of a preferred skidder according to one embodiment of the present invention.
Figure 2:
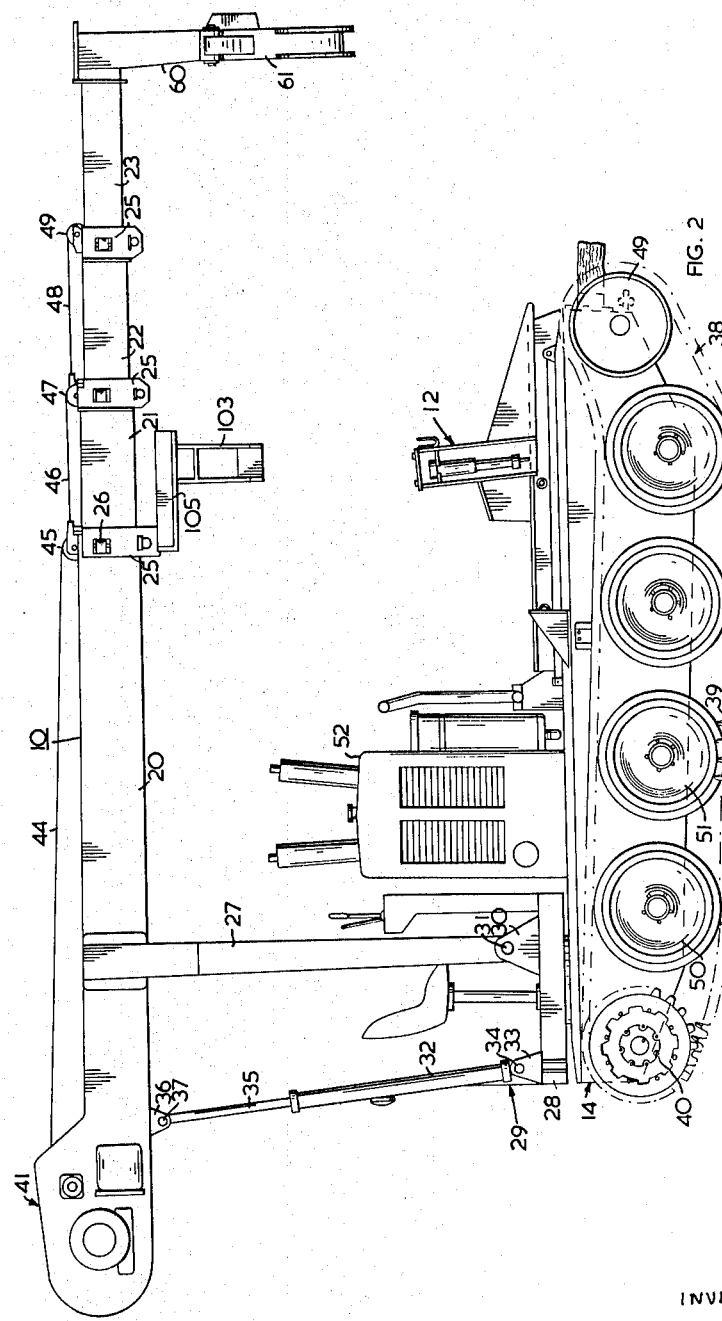
FIGURE 2 is a side elevation of the skidder of FIGURE 1.

The skidder according to a broad feature of the present invention may be considered to be the novel combination of several novel elements; namely, a retractable boom; a grapple; a tree bunk; a tree heeling device; and a self-propelled track-laying vehicle having a novel suspension system. In the embodiment shown in FIGURES 1–4, there is shown the combination of the following elements; namely, a retractable telescoping boom 10; a grapple mechanism 11; a tree bunk mechanism 12; a tree heeling device 13; and a self-propelled track-laying vehicle 14, provided with a novel suspension system 15 (see FIGURE 4). Each of these elements will be described individually.

The boom 10 comprises a single fixed section 20 and three movable, telescoping sections 21, 22 and 23. The movable sections are guided by means of flange type rollers 24 mounted at the lower portion of a rectangular framework 25 mounted at the free end of each section into which the telescoping section telescopes, and by lateral thrust roller 26 mounted within framework 25 on each side thereof. Secured to the framework 25 associated with fixed boom section 20 is a heeling device 13. Extension and retraction of the boom is controlled and initiated by sheave system 41, driven by hydraulic motor-reducer combination 42, and by pulley-cable combinations 43–44, 45–46 and 47–48.

The fixed section 20 of boom 10 is disposed within arch 27, which is itself pivotally secured to the deck 28 of forward cockpit 29 by brackets 30 and pins 31. The connection between fixed section 20 and arch 27 is such that the boom may tilt, under the action of hydraulic cylinders 32. Cylinders 32 are pivotally fixed to the deck 28 by brackets 33 and pins 34, and the slidable piston rod 35 of piston 32 is pivotally secured to fixed boom section 20 by means of brackets 36 and pins 37. In turn, the forward cockpit 29 is slewably mounted on the tracked undercarriage 14.

The tracks 38 consist of a plurality of track shoes 39 secured to a pair of endless track bands. Tracks 38 entrain a drive sprocket 40, an idler wheel 49, and two pairs of leading wheel 50-trailing wheel 51 combinations. The drive sprocket 40 is driven by an hydraulic motor powered by an engine 52, mounted on the tracked undercarriage 14. Also mounted on the tracked undercarriage, and at the rear thereof, is a tree bunk 12.

SPECIFIC DESCRIPTION

Figure 7:
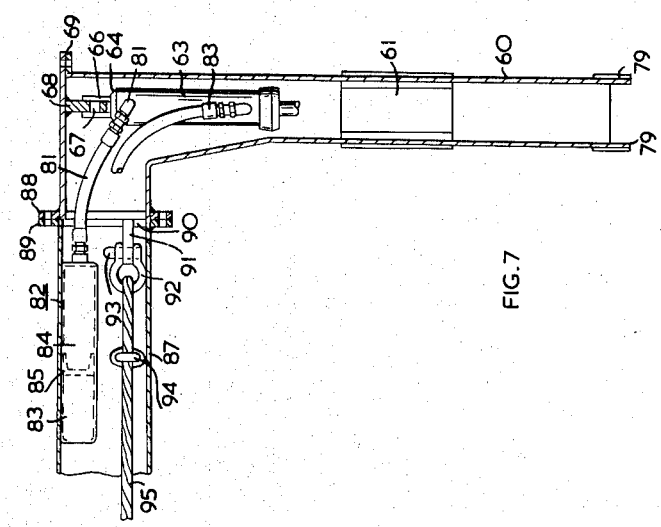
FIGURE 7 is a side elevation, partly in section, of the tree grapple of FIGURE 6.

*The grapple.*—The grapple (see FIGURES 5–7) consists generally of a fixed tong 60 and a movable tong 61. Fixed tong 60 is formed with a hollow shank 62 within which is situated an hydraulic cylinder 63. The barrel 64 of the cylinder 63 is attached to the upper cover plate 65 of fixed tong 60, by means of a pair of brackets 66 on said cylinder and a bolt 67 passing therethrough and also through bracket 68, which is itself welded or otherwise rigidly affixed and depends from upper cover plate 65. The piston rod 72 of the cylinder 63 is connected by means of a clevis 73 and a pin 74 to a lug 75 which is either integral of fixedly mounted on the movable tong 61. Upper cover plate 65 is secured to flanges 69 on fixed tong 60, by means of bolts 70 and nuts 71 (see FIGURE 5).

The movable tong 61 is itself pivotally mounted on the fixed tong 60 by means of a pin 76 passing through a pair of spaced-apart brackets 77 of the fixed tong 60 and a washer 78. In order to assure positive gripping action between the fixed tong 60 and the movable tong 61 and the tree to be gripped, fixed tong 60 is provided with a barb 79 at its tip, and the movable tong 61 is provided with a plurality of teeth 80, in this case three, along its inside surface.

An hydraulic line 81 runs from the upper portion of the cylinder 63 to an hydraulic accumulator 82. Hydraulic accumulator 82 includes a main, sealed cylinder divided into two chambers 83 (containing a gas, e.g. nitrogen, under pressure) and 84 (containing hydraulic fluid) by a freely slidable floating piston 85 disposed therein. The operation of the hydraulic accumulator 82 and of the grapple 11 will be described hereinafter with reference to FIGURE 8. The lower chamber of the cylinder 63 is provided with hydraulic outlet line 86 whose function and operation will be described in detail with reference to FIGURE 8.

The grapple 11 is attached to a terminal portion 87 of a boom (such as movable section 23 of boom 10 of FIGURES 1–4) by means of bolted together flanges 88 and 89 on the grapple 11 and the boom portion 87, respectively. Within the terminal portion of 87 of the boom 10, there is placed the hydraulic accumulator 82 and the anchoring of the retraction cable 95. Such anchoring includes an anchor plate 90 to which is attached a hitch plate 91. An eye bolt 92 is attached to hitch plate by means of pin 93. The eye bolt 92 in conjunction with clamp 94 is used to anchor the retraction cable 95.

Figure 8:
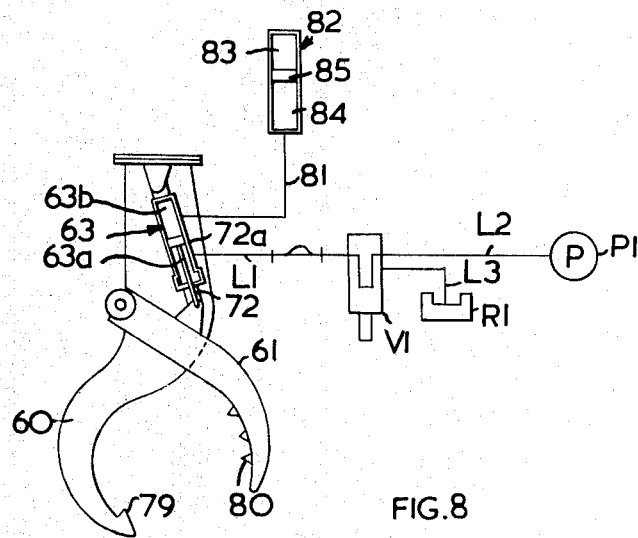
FIGURE 8 is a diagrammatic representation of the operating mechanism of the tree grapple of FIGURES 5, 6 and 7.

FIGURE 8 will be described hereinafter with respect to the detailed description of the operation of the grapple under the heading "Operation of the Grapple."

Figure 5:
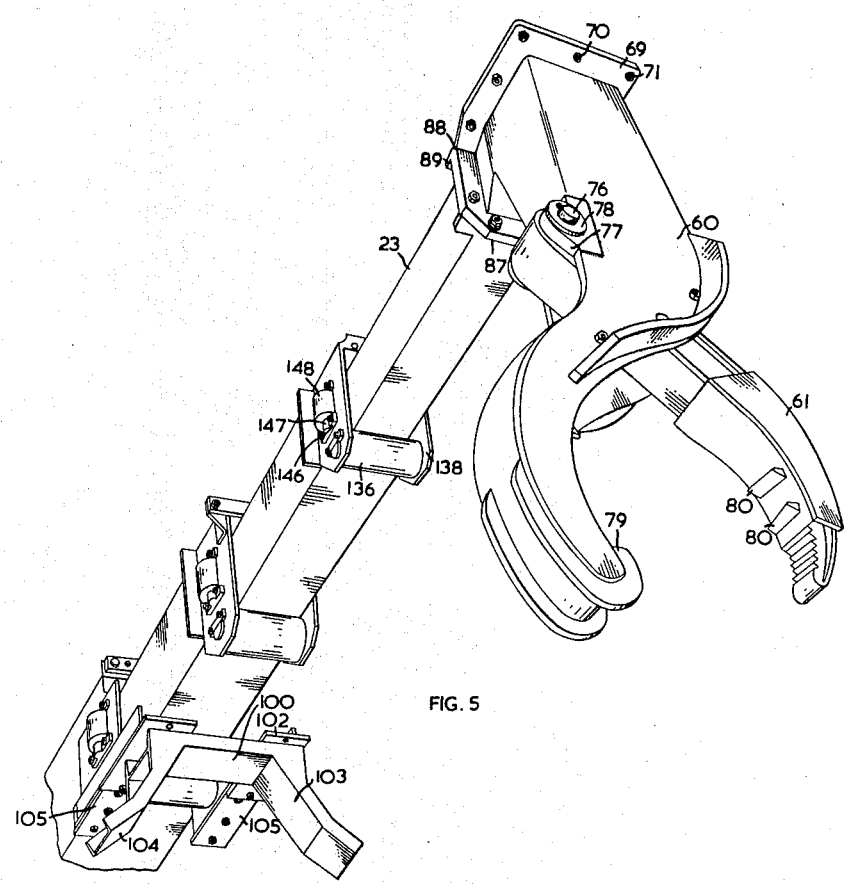
FIGURE 5 is a perspective view of a preferred boom, grapple and tree heeling device for use with the skidder of FIGURE 1.
Figure 6:
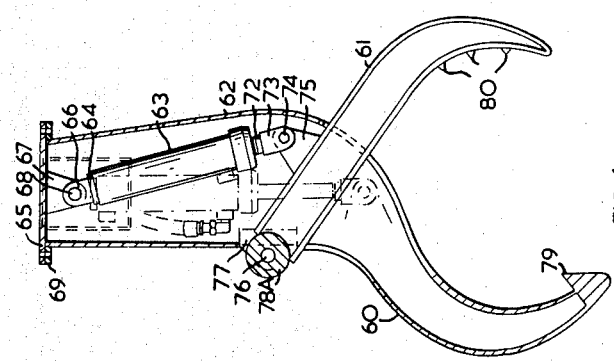
FIGURE 6 is a front elevation, partly in section, of the tree grapple of FIGURE 5.

*The tree heeling device.*—The tree heeling device 13 (see FIGURE 1) will now be described, paying particular attention to FIGURE 5. The tree heeling device 13 comprises a main transversely extending U-beam 100. Secured to the upper portion of the U-beam 100 are a pair of spaced-apart longitudinally extending plates 102. These plates are provided with means adjustable to attach the tree heeling device 13 to the fixed section 20 of the boom 10 (as shown in FIGURE 5) by means of angle brackets 105. Depending from the main transverse plate 100 are a pair of downwardly and outwardly extending arms 103 of channel cross-section, extending at an angle of approximately 30° to plate 100 and provided at their ends with extension arms 104 also of channel cross-section, extending at an angle of approximately 45°.

The operation of the tree heeling device will be described hereinafter under the heading "Operation of Tree Heeling Device."

THE TELESCOPICALLY MOVABLE BOOM

A preferred embodiment of the telescopically movable boom is shown in FIGURES 9, 10 and 11. The boom 110 includes a fixed section 111, a telescopically movable intermediate section 112, and a telescopically movable terminal grapple section 113. The fixed section is provided with a system of sheaves 114 which are operative to extend and retract the telescopically movable sections and which will be described in greater detail in FIGURES 13–15 inclusive. FIGURE 9 is intended to show the external construction of the boom 110 showing the manner in which a telescoping section of the boom is adapted to slide within a previous section and also showing the manner in which the boom is prevented from lateral displacement during its longitudinal travel. FIGURES 10 and 11 are intended to show the internal construction of the boom 110 at intermediate points, showing the further means for controlling the longitudinal travel of the boom within one section and also of the means for preventing the lateral displacement during the movement.

The construction of boom sections 112 and 113 are shown in FIGURE 10. As seen in FIGURE 10, the boom section 112 is constituted by a pair of substantially U-shaped members 115 welded together at 116 and 117. It is provided with a downwardly projecting upper guide bar 118 attached at the upper weld joint 116, and an upwardly extending lower guide bar 119 attached at the lower weld joint 117. The grapple section 113 is also formed of two U-shaped members 120 welded together at 121 and 122 (see FIGURE 13) and is provided at its upper portion with a pair of welded-on brackets 123 on to which is keyed a shaft 124 held in place by means of cotter pins 125. Rolling on this shaft is a roller 126 provided with bearings 127 and packing 128. The roller is provided with a central circumferential slot 129 keyed to the downwardly extending guide bar 118.

Traversing the lower interior end of the grapple section 113 is a transverse bar 130 secured thereto by weldments 130b and 130a, and to which is attached a pair of downwardly depending brackets 131, by means of bolts 132. These brackets support bearings and packings 133, in which a shaft 134 is keyed for rotation. Rolling with the shaft 134 are a pair of rollers 135, one on either side of the lower upwardly projecting guide bar 117.

FIGURE 11 depicts movable boom section 112 in which is telescopically, slidably mounted the grapple section 113. As mentioned herebefore, boom section 112 is composed of two generally channel members 115 welded at points 116 and 117, but accurately machined so as to provide the proper accurate rectangular cross-section. This movable boom section 112 is provided with a flange-type roller 136 which is provided with a shaft 137 keyed onto bracket 138. Shaft 137 is prevented from rotation by means of locking bars 137a.

Shaft 137 is provided with bearings 140 and packing 139. Roller 136 has its axle (or shaft) 137 running transversely of the longitudinal axis of the boom 112. The bracket 138 is welded or otherwise permanently attached to the terminal end of movable boom section 112. As seen in FIGURE 11, grapple section 113 is adapted to roll on roller 136.

The terminal end of the movable boom section 112 is provided at its upper side with a pair of brackets 141 in each of which is mounted a shaft 142 provided with bearing 143 and a sheave 144. The sheave 144 is provided with an extension 145.

In addition, each of the brackets 138 is provided with vertically separated brackets 146 in which is mounted a vertically extending shaft 147 on which is mounted a guide roller 148 (even though only one is shown for clarity). This guide roller 148 is intended to prevent lateral displacement of the movable boom section 113 while it is moving, but yet enable such movement to take place.

The complete operation of this slidable boom member will be described in greater detail hereinafter under the heading "Operation of the Boom." Interconnection of the various cables will also be described hereinafter with reference to FIGURE 12. The precise manner in which the boom is adapted to operate will be described hereinafter with reference to FIGURE 12.

DESCRIPTION OF FIGURES 13–15

Figure 15:
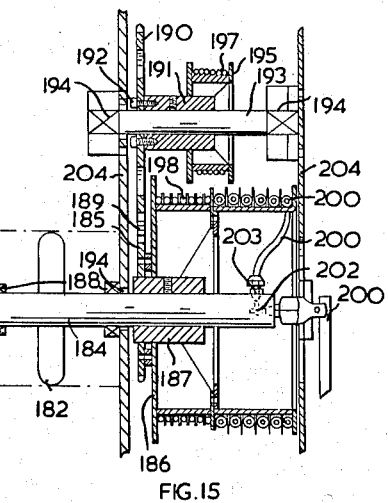
FIGURE 15 is a section along the line 15—15 of FIGURE 13.
Figure 16:
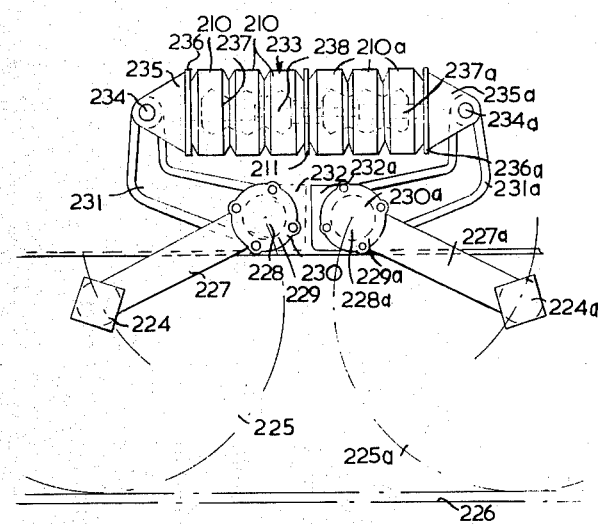
FIGURE 16 is a side elevation of an independent wheel suspension system for use with the skidder of the present invention.
Figure 17:
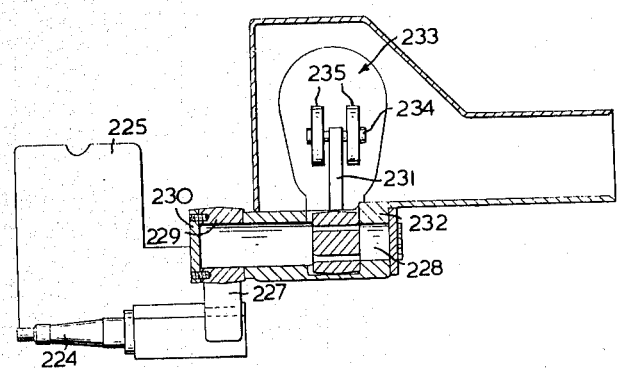
FIGURE 17 is a vertical cross-section of a portion of the independent wheel suspension system of FIGURE 16.

One embodiment of the winching system which may be used to extend and retract the boom previously described is shown in FIGURES 15–17. There is generally provided an hydraulic motor 181 and an hydraulic reducer 182 coupled by a coupler 183. The output shaft 184 of this hydraulic reducer 182 is used to drive a sprocket 185. A lower wind-up drum 186 is fixed to sprocket 185, together with bushing 187, shaft 184 rotating in bearings 188, which are the main bearings in coupler 182. Sprocket 185 has a chain 189 entrained therearound to drive a further sprocket 190 coupled to bushing 191 by studs 192 and splined to shaft 193, running in bearing 194. A wind-up drum 195 is rigidly secured to bushing 191.

The ratio of diameters of the upper wind-up drum 195 and the lower wind-up drum 196 is dependent upon the number of movable sections of the boom 10. If there are two movable sections, the lower wind-up drum 195 has a diameter twice as great as that of the upper wind-up drum 196.

On the other hand, if there are three movable sections, the diameter of the lower wind-up drum 196 is three times that of the diameter of the upper wind-up drum 195 and so forth. The upper wind-up drum 195 is adapted to wind and unwind the extending cable 197, while the lower wind-up drum 196 is adapted to wind and unwind the retraction cable 198.

Also rigidly coupled to the lower wind-up drum 196 is an hydraulic wind-up drum 199 from which an hydraulic cable 200 for an hydraulic cylinder for a grapple is wound (such as cylinder 64 of grapple 11). Hydraulic fluid is admitted by means of a "Barco" rotary joint 201 and a rotary connector 202 from the rotary joint to coupling 203 of the hydraulic cable 200.

The sheaves are located within a sheave box defined by parallel side plates 204, rigidly interconnected by transverse rods 205. The sheave box is provided with upper protective cover plates 206, 207 and 208. The entire mechanism is firmly secured to the fixed section of a telescoping boom (such as telescoping boom 10).

DESCRIPTION OF SUSPENSION SYSTEM OF FIGURES 16–19

Figure 18:
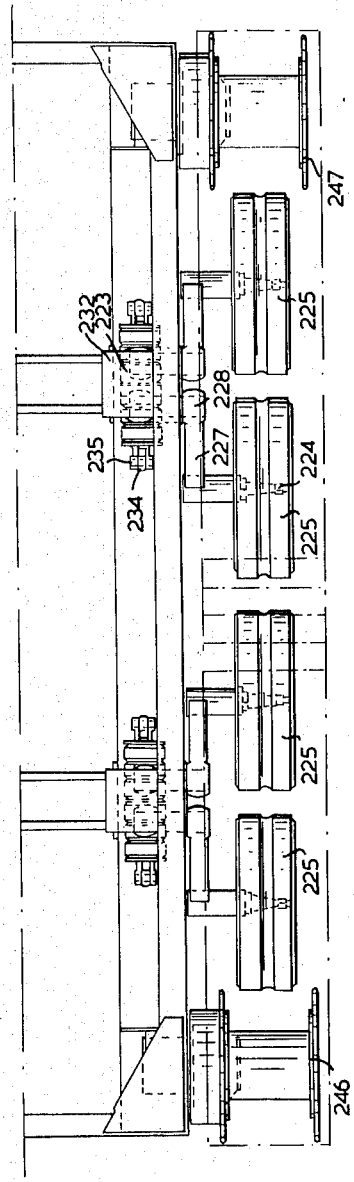
FIGURE 18 is a half-top plan view of the frame and wheels of the tree skidder according to an embodiment of the present invention, showing the suspension system of FIGURES 16 and 17.
Figure 19:
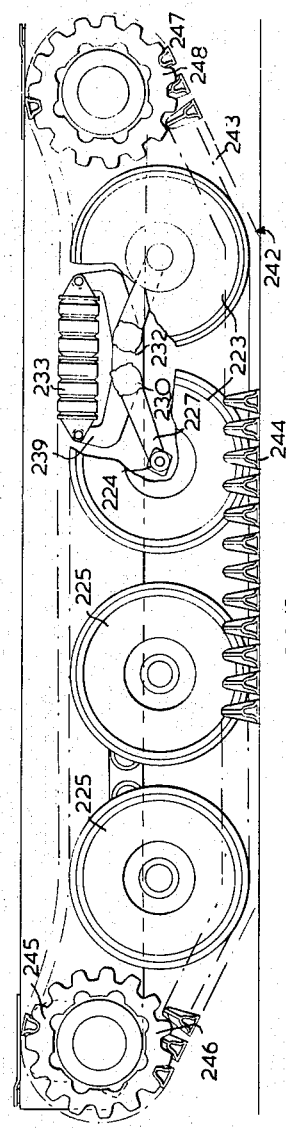
FIGURE 19 is a side elevation of the frame, wheels and track of a tree skidder according to one embodiment of the present invention and also showing the suspension systems of FIGURES 16 and 17.

A suspension system which may be used in the skidder of the present invention is shown in FIGURES 16 and 17, while the suspension system in place on the skidder is shown in FIGURES 18 and 19.

Referring to FIGURE 16 and FIGURE 17, it is seen that the axles 224 and 224a of the wheels 225, 225a which a track, such as 226 entrains, is mounted on a linkage arm 227, 227a which in turn is attached to a rocker arm shaft 228, 228a. The rocker arm shaft 228, 228a is coupled by means of a coupling 229, 229a and coupling plate 230, 230a to the linkage arm 227, 227a. A rocker arm 231, 231a is splined to shaft 228, 228a which in turn is splined in bracket 232, 232a. The rocker arm 231, 231a is linked to an elastic coupler 233 by means of coupling shaft 234, 234a and a pair of spaced-apart brackets 235, 235a. The brackets are fixed to plate 236, 236a which is provided with hollow cylinders 237, 237a, having a rod 238 slidable therewithin. Elastic coupler 233 comprises three sections 210, 210a, formed of rubber, separated by plate 211. Thus, vertical movement is translated through linkage arm 227, shaft 288, and rocker arm 231 to be translated into horizontal movement along elastic coupler 233, while cylinders 237, 237a move towards each other. Excess rebound movement is inhibited by cooperation between the ends of rod 238 and 237, 237a.

As seen in FIGURES 18 and 19 these suspension mechanisms are attached to the vehicle by means of a bracket 232 firmly secured to the chassis 14. The shaft 228 is fixedly mounted within the bracket 232, and thus the wheels are securely suspended from the chassis 14.

FIGURE 19 also shows the general configuration of the track 242. The track 242 is comprised of a pair of parallel spaced-apart rubber bands 243 (only one of which being shown), to which are attached a plurality of linked steel gripping track shoes 244. The track 242 entrains wheels 225, and the track shoe 244 are of such configuration that they mate with the driving cogs 245 on the drive sprockets 246 and the similar cogs 247 on the idler sprocket 248.

DESCRIPTION OF TREE BUNK OF FIGURES 20 AND 21

Figure 23:
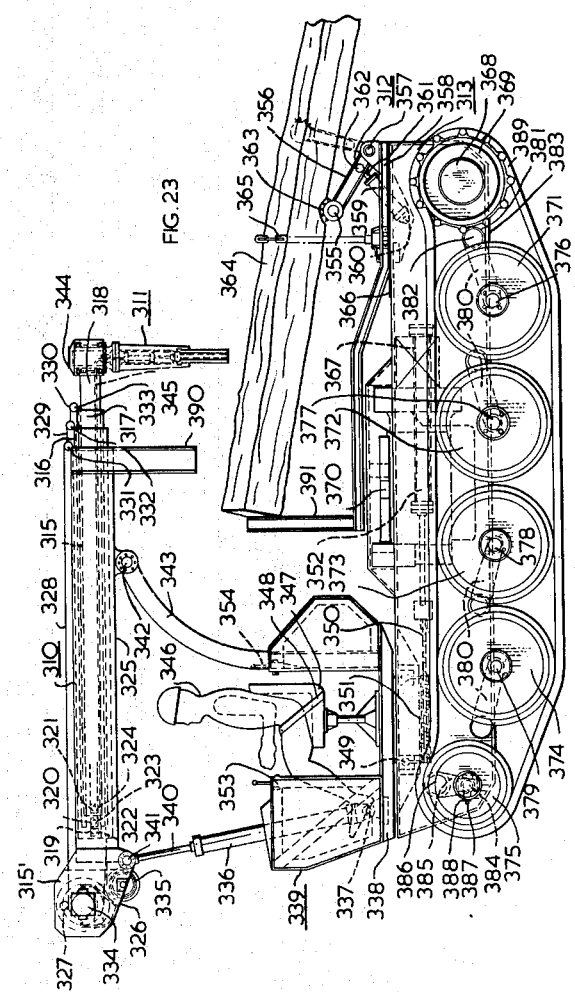
FIGURE 23 is a side elevational view of a tree skidder according to another embodiment of the present invention.
Figure 24:
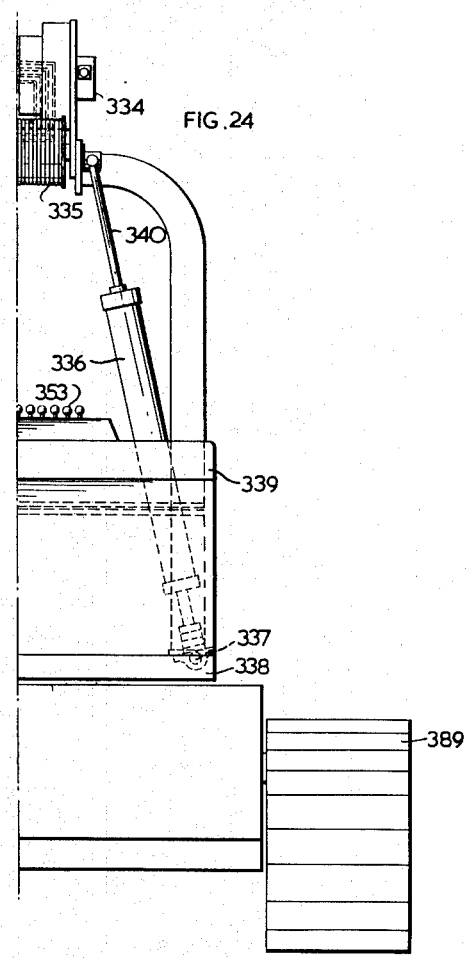
FIGURE 24 is a half front elevational view of the skidder of FIGURE 23.

The preferred embodiment of the tree bunk 12 shown generally in FIGURES 1–4 is now shown specifically in FIGURES 23 and 24. The tree bunk 12 consists of a plate 250 having a serrated upper edge 251, and adapted to slide generally vertical in guideway 252. The plate is provided with an ear 253 on each side thereof (see FIGURE 3), the ear 253 being attached to the free end of a piston rod 254. The hydraulic cylinder 255 is firmly attached to the upper portion of a post 256 at lug 257. Actuation of the hydraulic cylinder 255 thus causes the plate 250 to be raised to such a position that upper serrated edge 251 engages the butt of trees (not shown) thereby gripping the butts. The butts are retained on the bunk bar 250 by means of cooperation with spring loaded chains 258 linked to a central post 259, which chains are adapted to be thrown over the loaded trees before the hydraulic cylinder 255 is actuated, and locked means (not shown) associated with the posts 256. Raising of the bunk plate 250 thereby causes the serrated teeth 251 thereof to engage the trees and force the trees into engaging contact with the chain, thereby locking the trees on the bunk.

The entire bunk mechanism is adapted to be freely rotatable around stud 259, namely about a vertcial axis which is upstanding at the central longitudinal axis of the vehicle. The stud 259 is secured to the chassis 14 by means of brackets 263. A sleeve 261, rigidly secured to the bunk, is adapted to be placed around stud 259 to enable the bunk to be freely rotated. The bunk is retained on the stud 259 by means of nut 262.

Rearward of the bunk plate 250 is a sloping rear deck 264 braced by means of a support member 265. Forward of the bunk plate 250 is a support member 266 and a generally sloping facing plate 267.

GENERAL DESCRIPTION OF FIGURE 22

Figure 25:
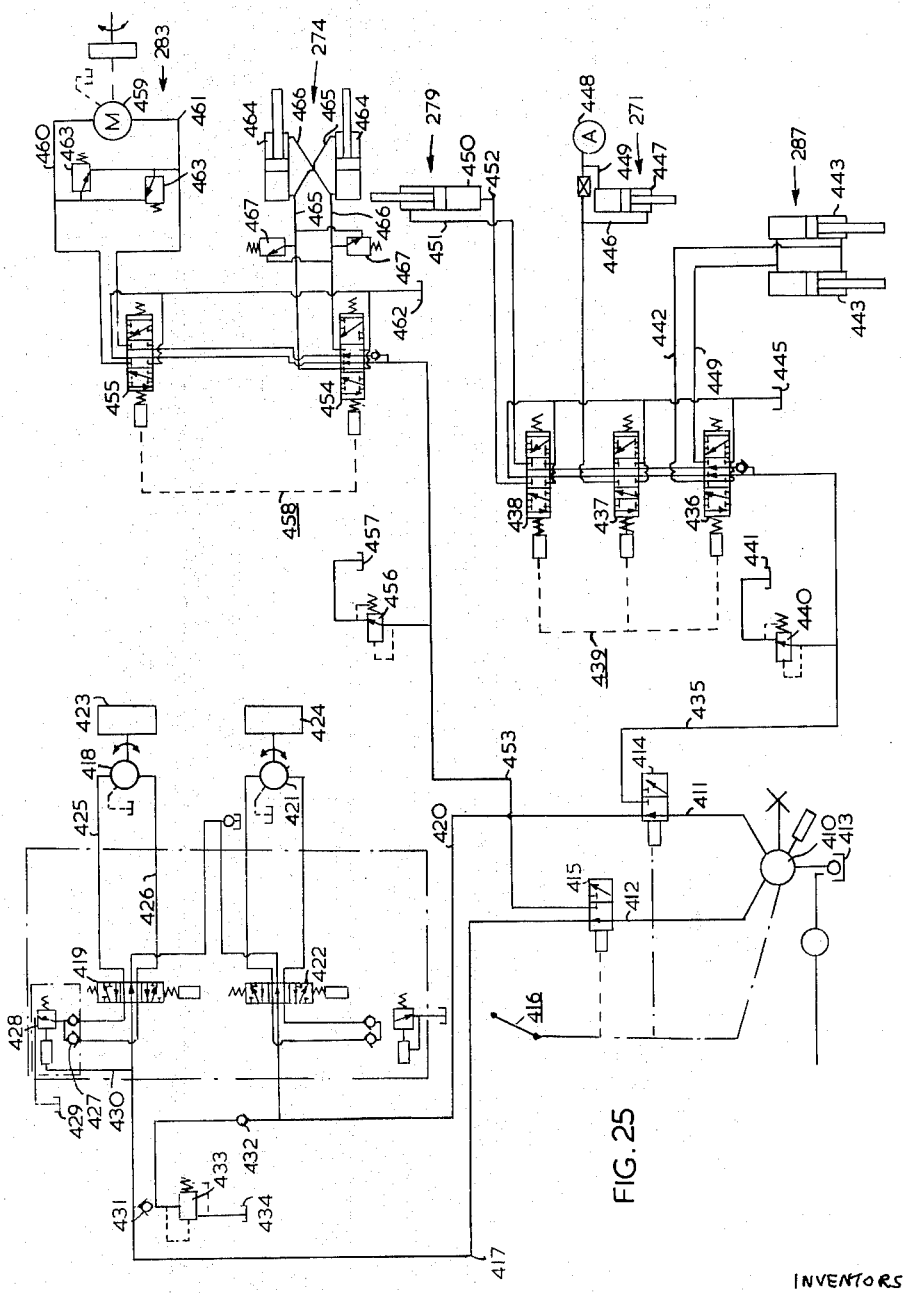
FIGURE 25 is a diagrammatic flow diagram of an hydraulic control system for use with an embodiment of this invention.

The skidder 288 of FIGURE 25 includes a telescopic boom 270 carrying a grapple 271 and a tree heeling device 272 on the fixed section thereof. An embodiment of the grapple 271 has been shown in FIGURES 5–8; an embodiment of the tree heeling device 272 has been shown in FIGURE 5 and an embodiment of the boom 270 has been shown in FIGURES 5 and 9–12. The boom 270 is mounted on the carriage 273 on a central post 274 and main arm 275, the boom being pivotally mounted to the arm 275 at a pivot point 276 by a pair of brackets 277 firmly secured to the fixed section 278 of the boom 270.

Pivoting of the boom 270 is accomplished by a means of an hydraulic cylinder 279 whose rod 280 is pivotally attached to the boom 270 at a pivot point 281 by means of a pair of brackets 282. Telescoping of the telescoping boom 277 is accomplished by means of sheaves and motors, indicated generally at 283, one embodiment of which has already been more fully described with reference to FIGURES 15–17.

Figure 20:
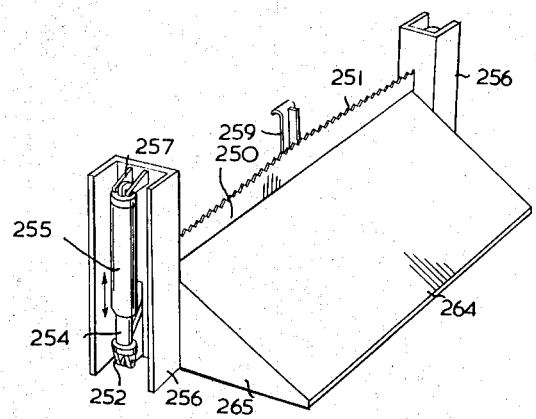
FIGURE 20 is a perspective view of a tree bunk used in the skidder of FIGURES 1–4.
Figure 21:
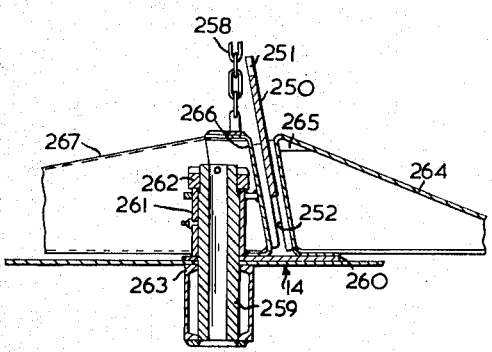
FIGURE 21 is a central transverse cross-section of the tree bunk of FIGURE 20.

The operator 284 sits in the operator's cockpit 285 and swivel seat 286. As is shown in FIGURE 25, the operator is facing a forward control console which contains vehicle travel and engine controls. For tree loading operations, the operator 284 may swivel in his chair to face the grapple 271 and arear control console which contains controls for the operation of the boom 270, for the operation of the grapple 271, for the operation of the tree bunk 287 and for the operation of the vehicle 288 itself. Tree bunk 287 includes a vertically slidable transverse plate (not shown) operated by an hydraulic cylinder 289. It is also provided with a forward deck 290 and a forward stop 291, together with a rear sloping deck 292. The entire mechanism is mounted on a slidable rotatable deck 293. The structure of a tree bunk similar to tree bunk 287 shown herein was more fully described with reference to FIGURES 20 and 21.

The skidder 288 is basically a self-propelled tracklaying type vehicle. The drive is by means of a motor 294 conventionally coupled to the drive mechanism of the tracks 295. Each of the pair of tracks 295 entrains a forward drive sprocket 296 and four road bearing wheels 297 and may optionally also entrain a rear idler wheel 298. The suspension of the wheels 297 may be either a conventional suspension, or may be the suspension previously more fully described with reference to FIGURES 16 and 17.

The general operation of this embodiment of this invention will be described further hereinafter.

DESCRIPTION OF SKIDDER OF FIGURES 23 AND 24

Figure 3:
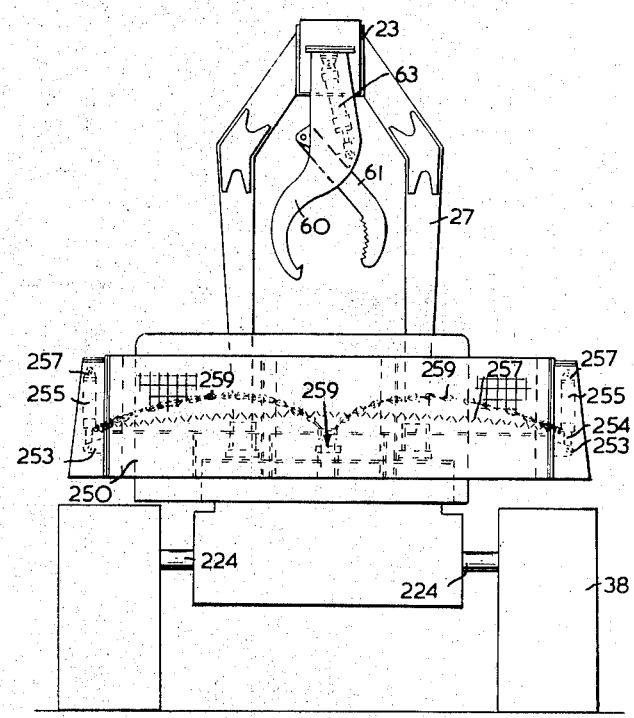
FIGURE 3 is a rear elevational view of the skidder of FIGURE 1.
Figure 4:
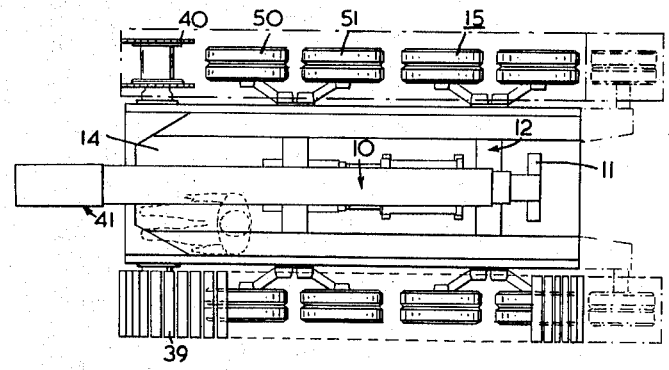
FIGURE 4 is a top plan view of the skidder of FIGURE 1.

Another embodiment of the present invention is shown in FIGURES 23 and 24. In this embodiment, the boom 310 is a telescopic boom consisting of a fixed section 315 and several movable sections. As shown in FIGURE 3, the boom contains three movable sections 316, 317 and 318. Embodiments of the boom and guidance mechanism therefor which may be used as the boom and guidance mechanism in this embodiment has already been more fully described with reference to FIGURES 10–12.

Figure 13:
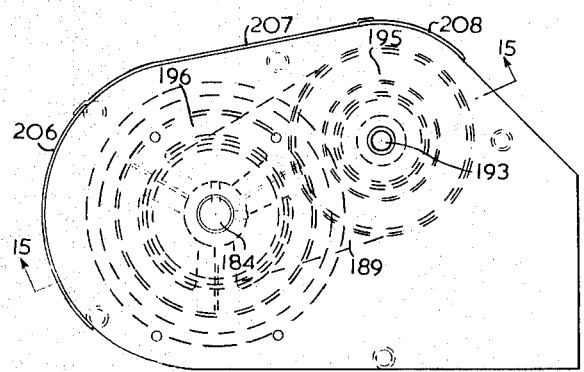
FIGURE 13 is a side elevation of the winch box which cooperates with the cabling system to operate the telescoping boom (with the side plate shown in phantom), for use with the present invention.
Figure 14:
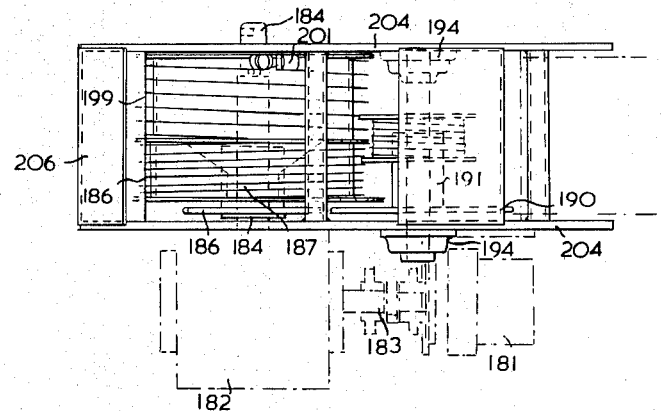
FIGURE 14 is a top plan view (with the cover plate removed and partly in phantom), of the sheaves of FIGURE 13.

Embodiments of suitable control mechanism have already been more fully described with reference to FIGURES 13–15.

In general, in this embodiment, such mechanism includes one retraction cable 326 entraining a double drum 327 (one embodiment of which having been more fully described with reference to FIGURES 15–17) to retract the boom sections 316, 317 and 318. There are also three extending cables 328, 329 and 330 entraining pulleys 331, 332 and 333 respectively, interlocked with the movable sections 316, 317 and 318 respectively for extending the boom 310. The boom winch 327 for the cable is driven by an hydraulic motor 334 through a speed reducer built into the winch drum 327. The double drum winch 327 and the hydraulic motor 334 are mounted on the forward end of the fixed boom 315 within brackets 315a. In addition, an hydraulic hose reel 325 is also mounted on the front end of the fixed section 315 of the boom 310.

The telescopic boom 310 is used because this type of boom reduces the rear end radius, thereby providing a skidder with greater mobility in mixed-wood-type forest, and on partial cutting operations.

The boom lift is provided by a pair of hydraulically operated double acting cylinders 336. The lower end of each of the hydraulic cylinders 336 is a universal pivot mounting 337 on the rotary deck 338 of the operator's cockpit 339. The piston rod 340 of the hydraulic cylinder 336 has a universal pivot mounting 341 on the forward part of the fixed boom section 315. The boom pivots at 342 on a boom frame 343 which is fixed at its base to the rotary deck 338. The pivot point 342 is set approximately at a mid-point of the vehicle. Because of the manner in which the boom pivoting cylinders 336 and the boom frame 343 are mounted, the cylinders 336 can be lateral bracing for the boom side loading.

Because the boom lift cylinders 336 are at the forward end of the boom 310, and because the pivotal point 342 is near the end of the fixed boom sections 315, there is provided more space for the tree loading area. This arrangement also provides greater stability and reduces the torque loading on the boom frame 343. Furthermore, there is better boom control due to a longer cylinder stroke. In addition, the piston rod 340 is under tension rather than under compression and this is a structural advantage.

The grapple mechanism 311 on the boom in the embodiment may be the same as the grapple mechanism 11 on the boom in the embodiment described in FIGURE 1, and which was further described in FIGURES 5–9. In general, however, the grapple comprises an hydraulically operated grapple with one fixed and one movable tong. The grapple assembly is rotatably mounted at 344 on the terminal movable boom section 318 for easier alignment of the grapple with the tree trunk. All of the hydraulic lines 345 for the grapple mechanism are inside the boom sections and are reeled up on the hydraulic hose reel 335. The rotary movement of the grapple increases the boom efficiency by permitting easier adjustment on the tree.

The boom 310 is mounted on the vehicle by means of a rotary deck 338. The boom frame 343 is directly connected to the rotary deck 338 while the boom pivot 242 is so positioned that the boom radius at ground level is reduced to a minimum. The boom frame 343, together with the telescopic boom 310 and the boom lift cylinders 336 provides effective protection for the operator 346. The operator 346 rotates with the boom 310 and thus always faces away from the grapple 311.

The rotary deck 338 is mounted on a shear ball mechanism 349 with slewing motion to either side of the vehicle. The slewing motion is provided by means of a cable 350 slung around the outer race 351 of the shear ball mechanism 349 and operated by a pair of hydraulic cylinders 352. By these means, there is provided a good slewing motion control.

The operator 346 sits in the operator's cockpit 339 on a swivel seat 347 provided with a safety belt 348, between a forward hydraulic control console 353 and a rearward hydraulic control console 354. For tree loading operations, the operator swivels on his chair and turns toward the boom grapple 311 and rear control console 354 which is equipped with boom control, tree bunk control and vehicle travel controls. For skidding operations, the operator 346 faces in the opposite direction, namely in the direction shown in the drawings, sitting in front of the forward control console 353 which contains only vehicle travel and engine controls.

The tree bunk 312 comprises a tubular transverse tree bunk bar 355 fixedly mounted on a crank arm 356 which is rotatably mounted at a pivot point 357 at the end of the swivel deck 358. The crank arm 356 is adapted to be raised and lowered by means of an hydraulic cylinder 359. One end of the hydraulic cylinder is pivotally mounted at 360 to a portion of the rotary deck of the bunk mechanism 312, and the piston rod 361 is pivotally connected at 362 to the crank arm. The tree bunk bar 355 is provided with a plurality of rows of spikes 363 which point upwardly while the bunk is in its "ready" position for loading trees 364. Also attached to the rear rotary deck 358 and situated forwardly of the tree bunk bar 355 is a spring loaded chain 365. The trees 364 are secured on the bunk 312 by raising the bunk bar 355 and forcing the trees 364 against the spring loaded chain 365, thereby increasing penetration of the spikes 362 into the trees 364. When the chain 365 is released and the bunk bar 355 is raised as shown in broken lines, the spikes 362 retract from the trees 364 allowing them to slide off the vehicle as it drives away. The entire tree bunk assembly is rotatably mounted on the vehicle on a swivel deck 358 which swivels on a turret 366 which may include means governing the rotation mounted on the turret 366 of the frame of the vehicle.

The tree bunk 312 secures the tree effectively. Because of the fact that the tree bunk 312 is rotatably mounted on the vehicle, there is provided better manoeuverability of the skidder.

The vehicle is a self-propelled track-laying type vehicle, driven by means of an hydrostatic transmission consisting of one pump 367 with split flow characteristics and two drive motors (not shown), one shown for each of the tracks. The motors are directly connected to the drive sprockets of the track, and by shunting the motors from parallel to series connection or by variable flow pumps or motors, the speed range selection for off-the-road travel and road travel may be achieved. The motors are controlled from both the front control console 353 and the rear control console 354 of the operator's cockpit 339 by means of a remote hydraulic control system. Driving means for the hydraulic pump is provided by an engine which is a pancake engine 370 mounted under the forward end of the swivel deck 358 of the tree bunk mechanism 312.

Each track entrains a rear drive sprocket 369, four road wheels 371, 372, 373 and 374, and a forward track idler wheel 375. Each of the road wheels is rotatably mounted on its individual axle 376, 377, 378 and 379 respectively, while each axle is connected by a crank arm 380 to a torsion-type suspension which consists of an outer tube 381 fixed to the chassis; an inner concentric rod 382 fixed to the crank arm, and a rubber joint 383 connecting the inner rod to the outer tube. As shown, two of the road wheels, namely 274 and 373, are trailing their suspension points and two of the road wheels, namely 372 and 371 are leading their respective suspension points.

The track idler 375 is mounted on its own independent axle 384, which is connected by a crank pivotally mounted on the crank arm 385, which, in turn, is pivoted to the chassis at 386. A track tensioning means which consists mainly of a longitudinally extending bolt 387 with a nut 388 travelling on the bolt is also provided. Mere rotation of the nut 388 upon the longitudinally extending bolt 387 causes adjustment of the track tension.

Because of the particular structure and cooperation of the various integers of the track drive, the vehicle is particularly well suited for wood harvesting operations.

GENERAL OPERATION OF THE SKIDDER OF FIGURES 1-4

In operation of this tree skidder, the tree skidder is backed into position alongside or adjacent to the trees to be loaded. The boom 10 is then manipulated either by raising or lowering the boom with the boom lift cylinder 23 or by slewing the boom by means of the slewable cockpit and deck 29, or both, until the tree grapple 11 is adjacent the felled tree. The grapple 11 is then actuated to engage the tree. The boom 10 is then manipulated again and the trees are lifted clear of the ground—the butt being engaged and restrained in the heeling device 13—and swung into position on the tree bunk 12 in its loading position. This operation is continued until the tree bunk 12 has a platform of one layer of tree butts. A spring loaded chain 258 is thrown over the trees and fastened, the bunk plate 250 then being raised to wedge the trees between chain 259 and bunk plate 250. Then the bunk 12 is completely loaded. The skidder vehicle is driven with the trees dragging behind, to the tree working area. The trees are usually placed in a position perpendicular to the road, so that a tree processing machine can drive along the road perpendicular to the trees and process the trees.

To unload, the toothed plate 250 of the bunk 12 is lowered. The chain 259 thus becomes slack and permits the trees to slip off the bunk 12 as the vehicle is driven away. The trees remain at the tree processing area.

One advantage of the present invention is that the skidder has substantially equal mobility, whether it is travelling in a forward direction or in a reverse direction.

GENERAL OPERATION OF THE SKIDDER OF FIGURE 22

In operation, the vehicle 288 is backed up to the site of the felled trees, with the operator 284 swivelling in his swivel seat 286 so that he faces the direction of travel. When he is in the proper operating position, the boom 270 is moved into position adjacent the trees by telescoping the boom 270 or by raising or lowering the boom 270 by means of the boom pivoting cylinders 279 or by rotation of the boom 270 by slewing arm 275 to rotate boom 270. The grapple mechanism 271 is then actuated and the tree is lifted free of the ground—the butt being engaged and restrained in the heeling device 272—and swung into position on the tree bunk mechanism 287. The forward end of the trees abuts against the front rack 291 on the tree bunk mechanism forward deck 290. When a single layer of trees has been placed entirely across the transverse bar (not shown) a spring loaded chain (not shown) is passed over the trees and engaged. The transverse bar is then raised until the trees are firmly secured between such bar and the chain. Then, a plurality of trees is placed upon the deck so formed. The operator 284 then swivels in his chair 286 so that he is facing in the direction as shown on the drawing and the vehicle is then driven forwardly, with the trees dragging behind.

When the vehicle arrives at the processing site, the transverse bar is lowered. This allows the spring loaded chain to become slack, which, in turn, permits the trees to slip off the bunk 287 as the vehicle is driven away. The trees remain at the tree processing area.

GENERAL OPERATION OF THE SKIDDER OF FIGURES 23 AND 24

In operation, the vehicle is backed up to the site of the felled trees, with the operator 346 swivelling in his swivel seat 347 so that he faces the direction of travel. When he is in the proper operating position, the boom 310 is moved into position adjacent the logs by telescoping the boom 310, or by raising or lowering the boom 310 by means of the boom pivoting cylinders 340 or by rotation of the boom 310 by slewing deck 338 to rotate boom 270. The grapple mechanism 311 is then actuated and the butt of tree 364 is lifted free of the ground—the butt being engaged and restrained in the heeling device 390— and swung into position on the tree bunk mechanism 312. The forward end of the tree 364 abuts against the front rack 391 on the tree bunk mechanism deck 358. When a single layer of trees has been placed entirely across the transverse bar 355 a spring loaded chain 365 is passed over the trees and engaged. The transverse bar 355 is then raised until the trees are firmly secured between bar 355 and chain 365. Then a plurality of trees is placed upon the deck so formed. The operator 346 then swivels in his chair 347 so he again is facing in the direction as shown on the drawing and the vehicle is then driven forwardly, with the trees dragging behind.

When the vehicle arrives at the processing site, the bar 355 is first lowered by rotation of arm 356. This permits chain 365 to become slack, and the slackened chain is disconnected. The bar 355 is then raised and the skidder moves out from under the load. The trees remain in the tree processing area.

SPECIFIC OPERATIONS—OPERATION OF THE GRAPPLE OF FIGURES 5-9

The operation of the grapple 11 is made clear with reference to FIGURE 9. Opening the valve V1 permits the hydraulic pump P1 to pump hydraulic fluid through line L2 to valve V1 and then through line L1 to the lower chamber 63a of hydraulic cylinder 63. This forces the piston 72a and rod 72 upwardly, thus raising movable tong 61 and thereby opening the grapple 11.

At the same time, hydraulic fluid is being forced from the upper chamber 63b of hydraulic cylinder 63 through line 81 to the lower chamber 84 of hydraulic accumulator 82. This excess fluid forces the free-floating piston 85 into upper chamber 83 of accumulator 82 which already contains nitrogen under pressure, thus building up excess pneumatic pressure therein. Since, however, the valve V1 is open to connect pump P1 to the system, this excess pressure remains as potential energy.

When it is desired to close the grapple 11, the valve V1 connecting the pump P1 to the system is closed. This permits the potential energy in the excess pneumatic pressure in the upper chamber 83 of the accumulator 82 to be released. This, in turn, forces the free-floating piston 85 into the lower chamber 84, which moves hydraulic fluid through line 81 into the upper chamber 63b of the hydraulic cylinder 63. This moves the piston 72a and its associated rod 72 downwardly, thereby moving movable tong 61 thereby closing the grapple 11. Excess hydraulic fluid may flow through line L1 to valve V1, and overflow may emerge through line L3 to overflow vessel R1.

An advantage of this sequence for opening and closing the grapple 11 is that more positive gripping of trees is assured through the reserve power residual in the accumulator 82.

OPERATION OF THE BOOMS OF FIGURES 9-12

The operations of the booms of FIGURES 5 and 9-11 will be explained in FIGURE 12 with particular exemplification of the boom of FIGURES 9-11.

The interconnection of the various cables is as follows: The retraction cable 197 is wound on wind-up drum 195 and is anchored at the inner end of the movable boom section 113 at clasp A. The extension cable 198-44 is wound on wind-up drum 186, entrains sheave 45 and then is anchored at clasp B to the end of movable boom section 112. Cable 145 is anchored at one end to an anchoring means associated with sheave 45, entrains sheave 47 and is then anchored at clasp C to the end of movable boom section 113.

Figure 12:
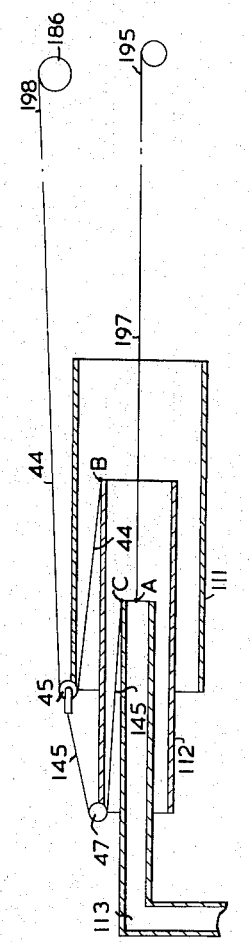
FIGURE 12 is a diagrammatic cross-sectional view of the operating mechanism of the boom of FIGURES 9, 10 and 11.

It is seen that as wind-up drum 186 is rotated in a clockwise direction, whereby to reel in extension cable 198–44, it simultaneously extends movable boom section 112 to the left (as seen in FIGURE 12). This movement also tends to extend movable boom section 113 to the left (also as seen in FIGURE 14), since the length of cable 145 is constant but movable boom section 112 has moved. This movement causes retraction cable 197 to lengthen and move to the left (as viewed in FIGURE 14), causing wind-up drum 195 to rotate in a counter-clockwise direction. It is also seen that each of movable booms 113 and 112 move simultaneously and one-half of the total amount of the extension of the boom 110. It is also evident either that wind-up drum 195 must rotate twice as fast as wind-up drum 186 (assuming that they have the same diameters) or that wind-up drum 195 must be one-half the diameter of wind-up drum 186. The use of drums of different diameters is preferred according to this embodiment of the invention.

In order to retract the boom, drum 195 is rotated in a clockwise direction, thereby reeling in retraction 197. This in turn, causes a movement of boom sections 112 and 113, cables 145 and 44–198 and rotation of sheaves 47 and 45 and wind-up drum 186 opposite to that as described above for extending the boom.

OPERATION OF SUSPENSION OF FIGURES 18–20

Assume the wheel 225 traverses a bump, causing axle 224 to lift. This causes linkage arm 227 to rotate in a counter-clockwise direction about bar 228 which in turn causes rocker arm 231 to rotate in a counter-clockwise direction. This forces bracket 235 to move horizontally, against the resilience of elastic coupler 233.

Then, as the vehicle moves so that wheel 225 has passed the bump, while wheel 225a just arrives to traverse the bump, the action on wheel 225 will be exactly opposite to that described, while the action at wheel 225a will be identical to that just described. In essence, the wheels 225, 225a "walk" over the bump, with a resilient "walking" action.

DESCRIPTION OF OPERATION OF TREE BUNK OF FIGURES 23 AND 24

The felled tree is gripped by actuation of the tree grapple 11 and is manoeuvered into place on the rear deck 264 while the serrated plate 250 is in its lowered position, by restraining the near end of the tree with tree heeling device 13 and by suitable slewing and tilting of the boom 10. When logs are placed entirely across the width of the bunk, the spring-loaded chain 258 is thrown across the trees and anchored on its respective post 256 (by means not shown). Then hydraulic cylinder 255 is actuated so that the movable piston rod 254, which is attached to the ear 253 of the lowered plate 250, is moved upwardly. This causes the serrated plate 250 to be raised, thereby gripping the trees between the chain above and the teeth below. Additional trees are manoeuvered onto the restrained trees on the tree bunk until the vehicle is fully loaded.

Unloading of the bunk is performed by reversing the above-described operations.

GENERAL DESCRIPTION AND OPERATION OF THE HYDRAULIC SYSTEM OF FIGURES 25

FIGURE 25 depicts diagrammatically the hydraulic system for the operation of the movement of the vehicle, as well as for the operation of the boom, grapple and bunk.

A pump 410 is provided to supply hydraulic fluid under pressure to lines 411 and 412 from tank 413. Line 411 is provided with selector valve 414 and line 412 is provided with selector valve 415. Valves 414 and 415 are operated by control 416.

When control 416 is actuated to place valves 414, 415 in the operating position as shown in the drawings, line 417 feeds hydraulic fluid input to motor 418 via 4-way valve 419, and line 420 feeds hydraulic fluid input to motor 421 via 4-way valve 422. Motor 418 operates track 423, while motor 421 operates track 424.

Under normal conditions, pump 410 pumps hydraulic fluid under pressure via lines 412, 417 through valve 419 to line 425 driving motor 418 and returning via line 426, check valve 427 and brake valve 428 to tank 429, from whence it is returned to tank 413 by lines (not shown). However, under abnormal conditions, as when motor 418 is overdriven, and tends to act as a pump, pressure in line 417 tends to drop, and this drop in pressure is sensed in pilot line 430. This, in turn, actuates brake valve 428 to cause a back-pressure to build-up in return line 426. This, in turn forces pump 410 again to drive motor 418.

A similar arrangement is shown associated with motor 421 but as the structure and operation thereof is identical with that for motor 418, it will not be described in detail.

Associated with line 417, but separated therefrom by check valve 431, and also with line 421 but separated therefrom by check valve 432, is a pressure relief valve system. This consists of a conventional check valve (i.e. 431 and 432) an internal conventional overload valve 433 and tank 434, which leads back to tank 413.

Figure 22:
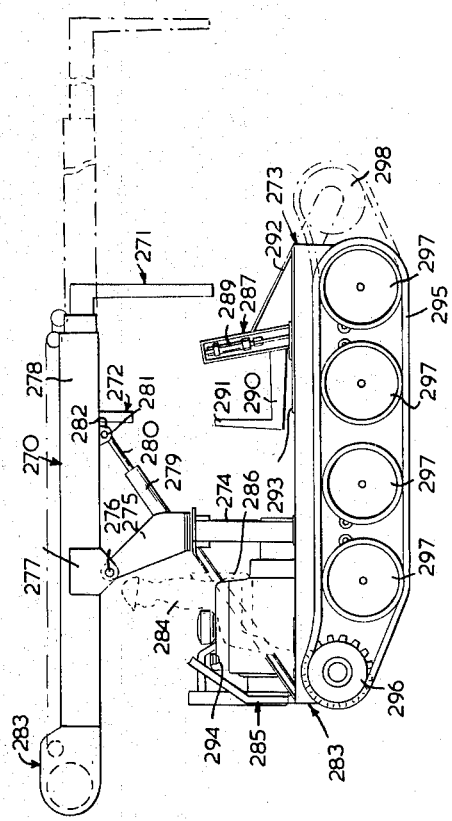
FIGURE 22 is a side elevational view of a skidder according to another embodiment of this invention.

Valve 414 may be actuated so that line 435 carries hydraulic fluid to 4-way valves 436, 437, and 438. Valves 436, 437 and 438 are operated by control 439 to operate the bunk 287, the grapple 271 and the boom lift 279 respectively (this figure being the hydraulic system for the embodiment of FIGURE 22). Associated with line 435, and functioning as a pressure relief system for the cylinders of bunk 287, grapple 271 and boom lift 279, is an overload valve 440 connected to tank 441, which is connected by lines (not shown) to tank 413.

Actuation of valve 436 causes hydraulic fluid to flow in line 442 to operate hydraulic cylinders 443 to raise the bunk plate (not shown) while simultaneously forcing hydraulic fluid from cylinder 443 to tank 445 via line 449. valve 436 may also be actuated to cause hydraulic fluid to flow in line 444 to operate hydraulic cylinders 443 to lower the bunk plate (not shown), simultaneously allowing hydraulic fluid to flow back in line 442 to tank 445, which is connected by lines (not shown) to tank 413.

Actuation of valve 437 causes hydraulic fluid to flow through line 446 to hydraulic cylinder 447 to operate grapple 271 by moving the movable jaw (not shown) away from the fixed jaw (not shown) while simultaneously forcing hydraulic fluid from cylinder 447 to hydraulic accumulator 448 via line 449, and compressing the gas within the hydraulic accumulator. Valve 437 may also be actuated to permit hydraulic fluid to flow back through line 446 to tank 445 under the action of hydraulic fluid from hydraulic accumulator 448 flowing in via line 449 to hydraulic cylinder 447. This, in turn operates grapple 271 with a "resilient grip" by moving the movable tong (not shown) towards the fixed tong (not shown).

Actuation of valve 438 causes hydraulic fluid to flow into hydraulic cylinder 450 via line 451, while forcing hydraulic fluid out of hydraulic cylinder 450 via line 452 to tank 445, thus operating hydraulic cylinder 450 to lower boom 279. Valve 438 may also be actuated to cause hydraulic fluid to enter hydraulic cylinder 450 via line 452 and to be forced into tank 445 via line 451, thereby operating hydraulic cylinder 450 to raise boom 279.

Valve 415 may be actuated to cause hydraulic fluid to flow via line 453 to valves 454 and 455, controlling slewing 274 and winching 283 respectively. In line 453, and to act as a pressure relief system for slewing 274 and winching 283 is an overload valve 456 and tank 457, leading via lines not shown to tank 413. Valves 454 and 455 are operated by control 458.

Valve 455 may be actuated to permit hydraulic fluid under pressure to feed into motor 459 and via line 460 and to outlet through line 461 to tank 462. Alternatively the motor 459 may be run in a reverse direction by actuation of valve 455 so that hydraulic fluid enters motor 459 via line 461 and outlets through line 460 to tank 462. Overload of motor 459 is prevented by motor overload valves 463.

Valve 454 may be actuated to cause hydraulic fluid under pressure to flow to hydraulic cylinders 464 via line 465, which simultaneously forces hydraulic fluid from hydraulic cylinders 464 via lines 466 to tank 462. This operates slewing 274 to cause clockwise rotation. Valve 454 may also be actuated to cause hydraulic fluid to flow in via lines 466 and out via lines 465 to tank 462, thereby operating slewing 274 to rotate in a counter-clockwise direction. Overload of the cylinders 464 is prevented by overload valves 467 connected to lines 465 and 466.

We claim:

1. A self-propelled, self-loading, skidder, said skidder comprising:
   (I) a tractor,
   (II) a loading station on said vehicle,
   (III) loading means on said tractor for engaging a selected prefelled tree from a first position on the ground, and for maneuvering said tree onto said loading station, said means consisting of:
      (A) a telescoping boom consisting of:
         (i) support means,
         (ii) a fixed member pivotally mounted on said support means for tilting movement in a vertical direction,
         (iii) a plurality of members telescoped within said fixed member,
         (iv) a plurality of guide rollers on said fixed member and on each of said movable members, said rollers cooperating with said fixed member and with said movable members to support and guide said plurality of members for movement with respect to said first member and with respect to each other, and
         (v) means interconnecting said first member and said plurality of movable members for extending said plurality of members outwardly with respect to said first member and with respect to one another to lengthen said boom, and for moving said movable members inwardly with respect to said first member and with respect to one another to shorten said boom,
      (B) a heeling device rigidly secured to and depending from, said fixed member, and
      (C) a grapple means secured to the outer end of the innermost movable member, said grapple means including one fixed jaw and a movable jaw movable towards said fixed jaw,
   (IV) means separate and distinct from said loading means and operable to engage selected trees at said loading station and for retaining said trees at said loading station;
   (V) means to operate said engaging means selectively to engage and to disengage said trees; and
   (VI) means for operating said tractor.

2. The skidder of claim 1 wherein said means to operate said telescoping boom comprises:
   (A) first cable means;
   (B) first sheaves associated with said cable means whereby winding of said cables on said sheaves moves said movable portions outwardly with respect to said fixed portion and said movable portions;
   (C) second cable means;
   (D) second sheaves associated with said second cable means; whereby winding of said cables on said sheaves moves said movable portions inwardly with respect to said fixed portion and said movable portions.

3. The skidder of claim 2 wherein said sheaves system is particularly adapted for winding a first cable and an hydraulic cable simultaneously while unwinding a second cable, said system comprising:
   (A) a framework provided with a pair of spaced apart shafts;
   (B) a sheave;
   (C) a coupled first driving sprocket journalled on one said shaft;
   (D) a pair of coupled sheaves;
   (E) a second driving sprocket coupled with said sheaves and journalled on said other shaft;
   (F) driving means between said sprockets;
   (G) a rotary joint at one end of said other shaft; and
   (H) means, on said other shaft connecting said rotary joint to said coupling.

4. The skidder of claim 1 wherein said heeling device comprises a horizontal, transverse plate, and a pair of diverging, downwardly extending legs originating at opposite ends of said transverse plate.

5. The skidder of claim 1 wherein said grapple comprises:
   (A) a substantially sickle-shaped fixed tong;
   (B) a substantially crescent-shaped tong, pivotally secured to one end thereof to a mid portion of said fixed tong;
   (C) an hydraulic cylinder, interconnecting said fixed tong, and said crescent-shaped tong;
   (D) and means for actuating said hydraulic cylinder whereby to cause said movable tong to move.

6. The skidder of claim 5 wherein said grapple includes means for actuating said hydraulic cylinder wherein actuation of said hydraulic cylinder causes said movable tong to be pivoted away from said fixed tong, and wherein said movable tong is biased to move towards said fixed tong by means of an hydraulic accumulator.

7. The skidder of claim 1 wherein said grapple comprises:
   (A) a hollow, sickle-shaped tong fixed to a support member;
   (B) a substantially crescent-shaped tong pivotally secured to a mid lateral portion of said fixed tong;
   (C) an hydraulic cylinder within said fixed tong, one end of which is pivotally secured to an upper end of said fixed tong, the free end of the piston of said cylinder being pivotally secured to a mid lateral portion of said movable tong;
   (D) means to actuate said hydraulic cylinder to cause said movable tong to be pivoted away from said fixed tong; and
   (E) an hydraulic accumulator biasing said movable tong towards said fixed tong.

8. The skidder of claim 2 wherein said grapple comprises:
   (A) a substantially sickle-shaped fixed tong;
   (B) a substantially crescent-shaped tong, pivotally secured to one end thereof to a mid portion of said fixed tong;
   (C) an hydraulic cylinder, interconnecting said fixed tong, and said crescent-shaped tong; and
   (D) means for actuating said hydraulic cylinder whereby to cause said movable tong to move.

9. The skidder of claim 1 wherein said loading station is a tree bunk assembly comprising:
   (A) a swivel deck rotatably mounted on a frame and means governing the rotation thereof;
   (B) a transverse tree bunk bar mounted on said deck for movement at least a major component of which is along a vertical axis;
   (C) means interconnecting said tree bunk bar and said deck;
   (D) means for moving said tree bunk bar along said vertical axis component; and
   (E) means for actuating said moving means.

10. The skidder of claim 9 wherein said bunk comprises:
 (A) a deck;
 (B) a pair of transversely spaced-apart posts upstanding from said deck;
 (C) a vertically slidable plate disposed between said posts;
 (D) tree engaging teeth along the upper edge of said plate; and
 (E) means associated with said posts and with lateral edges of said plate, and operative to slide said plate upwardly and downwardly.

11. The skidder of claim 1 wherein said grapple is of the type wherein a movable tong is pivoted towards and away from a fixed tong, said operating means for said grapple comprising:
 (A) an hydraulic pump;
 (B) an hydraulic cylinder;
 (C) means for directly connecting said hydraulic pump to said hydraulic cylinder and actuatable for causing said movable tong to pivot away from said fixed tong;
 (D) an hydraulic accumulator;
 (E) means for directly connecting said hydraulic accumulator to said hydraulic cylinder; and
 (F) means to actuate said hydraulic accumulator for causing said movable tong to pivot towards said fixed tong.

No references cited.

GERALD M. FORLENZA, *Primary Examiner.*